United States Patent [19]
Nakamura et al.

[11] Patent Number: 5,875,425
[45] Date of Patent: Feb. 23, 1999

[54] SPEECH RECOGNITION SYSTEM FOR DETERMINING A RECOGNITION RESULT AT AN INTERMEDIATE STATE OF PROCESSING

[75] Inventors: Makoto Nakamura; Naomi Inoue, both of Tokyo; Fumihiro Yato, Musashino; Seiichi Yamamoto, Urawa, all of Japan

[73] Assignee: Kokusai Denshin Denwa Co., Ltd., Tokyo, Japan

[21] Appl. No.: 772,987

[22] Filed: Dec. 23, 1996

[30] Foreign Application Priority Data

Dec. 27, 1995 [JP] Japan .................................. 7-340163

[51] Int. Cl.⁶ ...................................................... G10L 7/02
[52] U.S. Cl. ........................ 704/231; 704/245; 704/252; 704/244
[58] Field of Search ...................................... 704/245, 252, 704/241, 253, 244, 277, 238, 243, 231

[56] References Cited

U.S. PATENT DOCUMENTS

| | | | |
|---|---|---|---|
| 4,672,668 | 6/1987 | Kitazume et al. | 704/245 |
| 4,783,803 | 11/1988 | Baker et al. | 704/252 |
| 4,805,219 | 2/1989 | Baker et al. | 704/241 |
| 4,837,831 | 6/1989 | Gillick et al. | 704/245 |
| 4,881,266 | 11/1989 | Nitta et al. | 704/253 |
| 5,027,406 | 6/1991 | Roberts et al. | 704/244 |
| 5,293,584 | 3/1994 | Brown et al. | 704/277 |
| 5,315,689 | 5/1994 | Kanazawa et al. | 704/238 |
| 5,606,644 | 2/1997 | Chou et al. | 704/243 |
| 5,613,036 | 3/1997 | Strong | 704/243 |

FOREIGN PATENT DOCUMENTS

| | | |
|---|---|---|
| 3 711348A1 | 10/1988 | Germany . |
| 4 130632A1 | 3/1993 | Germany . |

*Primary Examiner*—David R. Hudspeth
*Assistant Examiner*—Vijay B. Chawan

[57] ABSTRACT

A speech recognition system for recognizing a system user's speech can shorten a recognition period by reducing the amount of necessary calculations without deteriorating the accuracy rate of recognition. The speech recognition system successively calculates statistical probabilities of acoustic models, outputs a one sentence recognition result corresponding to acoustic models having the highest reliability when the one sentence is detected and stops the following calculations.

15 Claims, 3 Drawing Sheets

LANGUAGE MODEL

SPEECH RECOGNITION SYSTEM FOR DETERMINING A RECOGNITION RESULT AT AN INTERMEDIATE STATE OF PROCESSING

FIELD OF THE INVENTION

The present invention relates to a speech recognition system, particularly to a speech recognition system which reduces the amount of necessary calculations in order to shorten a recognition period without reducing the accuracy rate of recognition.

DESCRIPTION OF THE PRIOR ART

In general, speech recognition techniques are used to analyze voice sounds spoken by a person, namely, to understand what a person speaks. Regarding speech recognition techniques, various research has been continued since the 1950's. Recently, recognition capability has been remarkably improved by developing techniques such as Hidden Markov Model, cepstrum and Δ-cepstrum.

In a conventional speech recognition system, statistical probabilities of an acoustic series are calculated from the beginning to the ending of the series. Upon calculating the probability of the last acoustic model, the most likely sentence is selected. Then, the detected most likely sentence is outputted as the recognition result.

That is, in the conventional speech recognition system, the start and end of the input voice sound are detected in accordance with power strength (sound level) of the input voice sounds. Statistical probabilities are calculated through the length of the detected voice so as to select a sentence of which the accumulated statistical probability is the highest. Then, the selected sentence is outputted as the recognition result.

Under the above condition, if the end of the detected voice is unclear or redundant, or if a sound level of the end of the detected voice is insufficient, the accuracy rate for recognition becomes lower. Further, unless the end of the input voice can be detected after speaking a word or a sentence, subjected to be recognized, a selection/detection is still continued until the end of the input voice is detected. Therefore, time is wasted when recognizing the input voice.

As described above, in the conventional speech recognition system, recognition speed is relatively slow and the accuracy rate of recognition is relatively low.

SUMMARY OF THE INVENTION

A purpose of the present invention is to resolve the above problems, that is, to reduce the amount of necessary calculations and to shorten the recognition period without deteriorating the accuracy rate of recognition.

To accomplish the above described purpose, the present invention provides a speech recognition system which utilizes acoustic models, wherein statistical probabilities of voice sounds detected by the speech recognition system are calculated. Then, the calculations are stopped and a recognition result is expressed from a language model.

The speech recognition system according to the present invention provides a language model register with a grammatical control member. The grammatical control member stores syntactic and semantic restrictions for excluding a word if the word is not registered in the grammatical control member.

Further, the grammatical control member excludes a series of words, if the series of words is syntactically or semantically wrong upon comparison with the syntactical and semantical restrictions.

The speech recognition system according to the present invention also provides language models which describe recognizable sentences that system users could input into the speech recognition system.

In addition, the speech recognition system according to the present invention provides previously determined acoustic models with a series of acoustic parameters.

BRIEF DESCRIPTION OF THE DRAWINGS

The present invention will become more fully understood by the accompanying drawings, which are given by way of illustration only, and thus are not limitative of the present invention, and wherein.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The speech recognition system according to the present invention will be described with reference to the drawings.

Figure 1:
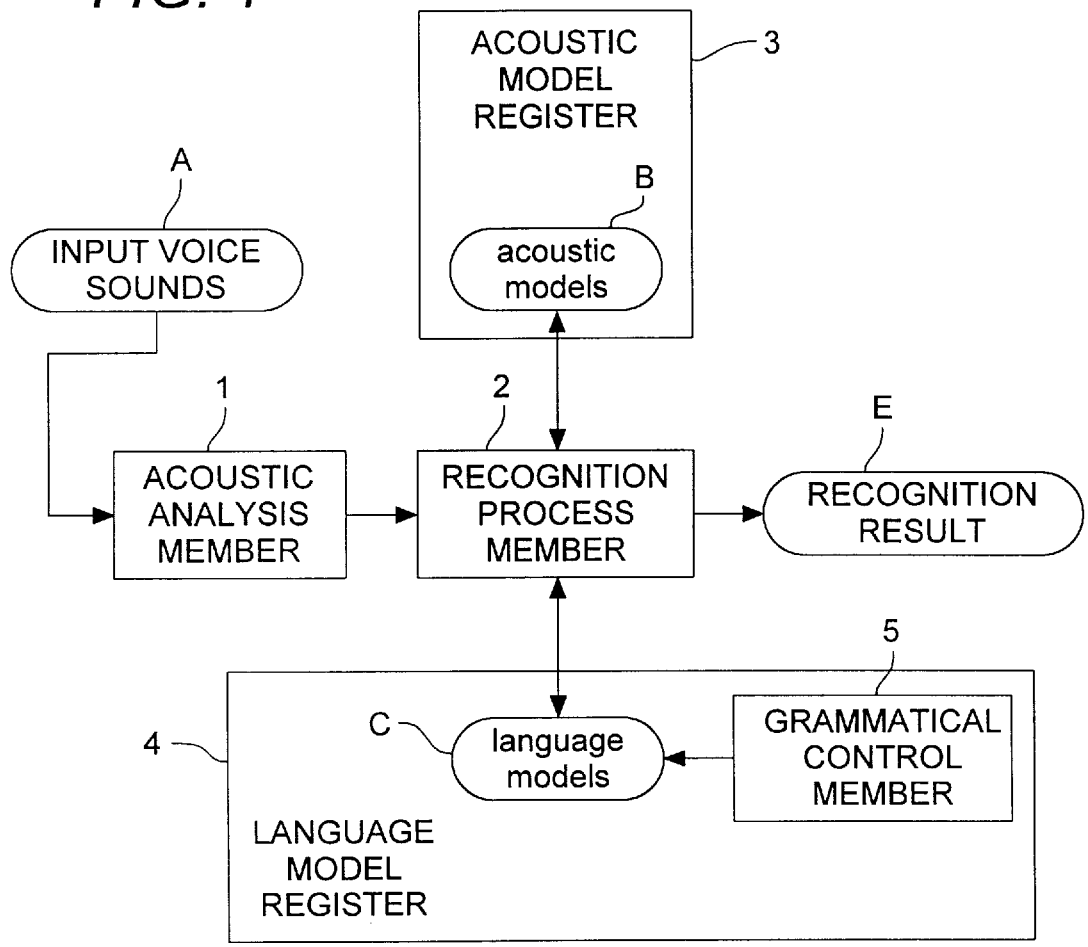
FIG. 1 shows a block diagram of a speech recognition system according to the present invention.

As shown in FIG. 1, the speech recognition system comprises as acoustic analysis member 1, a recognition process member 2, an acoustic model register 3 and a language model register 4 with a grammatical control member 5.

The acoustic analysis member 1 receives voice sounds A and acoustically analyzes the voice sounds A by determining a time series of acoustic parameters of the voice sounds A, such as cepstrum and/or Δ-cepstrum parameters. Then, transformed data is output to the recognition process member 2.

Cepstral analysis is performed by inversely Fuourier transforming a logarithmic spectrum. The cepstrum is in a linearly transformed relation with respect to the logarithmic spectrum, which is similar to a human acoustic sense. By utilizing the cepstrum, the speech recognition system can judge voice sounds in accordance with simulated human acoustic sense. Higher-order coefficients of the cepstrum correspond to a detailed structure of the spectrum and lower-order coefficients of the cepstrum correspond to an envelope of the spectrum. By selecting suitable orders, a smooth envelope can be obtained while utilizing a relatively small number of acoustic parameters.

The Δ-cepstrum technique analyzes the dynamic characteristics of a spectrum. The Δ-cepstrum is the first order (first differential coefficient) of a polynomial in which a time series of cepstrum, in a range within 50 ms through 100 ms, is developed.

The recognition process member 2 receives data output from the acoustic analysis member 1 and calculates the statistical probability of the series of acoustic models B registered in the acoustic model register 3 from the time series of acoustic parameters transformed from voice sounds A. Then, one series of acoustic models B having the highest-reliability is selected. The recognition process member 2 determines whether the selected series of acoustic models B is a part of the only sentence (language models C) registered in the language model register 4. The language models C are restricted by dictionary and grammar requirements of a grammatical control member 5. That is, if a new acoustic model is added to the present selected series of acoustic models B and any branch series connectable to the present series of acoustic models B can not be found, such a selected series of acoustic models B is judged as a part of the only sentence to be detected. Even when a detection process is intermediate, if the recognition process member 2 judges that the selected sentence is the only sentence registered and maintains the highest reliability during the several successive frames, the recognition process section 2 outputs the selected language model C as a recognition result E.

Sentences spoken by a system user are previously represented as a series of acoustic models B in accordance with syntactic and semantic restrictions. If a part of one acoustic model series B is common in a plurality of sentences, the common part of the acoustic model series is shared by the plurality of sentences.

Acoustic models B are registered in the acoustic model register 3 by learning time series of acoustic parameters. Each acoustic model B is represented in the HMM method or the like.

The Hidden Markov Model (HMM) method is a method for representing a time series of a spectrum of sound elements (ex. phoneme) and words in a style of outputs from stochastic state transition models. Usually, one sound element is represented as a few states (ex. 3 states). Each sound element and word is characterized by representing transition probabilities between states and output probabilities of various sound elements and words at the transition between states. According to the HMM method, variation of voice sound spectrums can be statistically represented.

The grammatical control member 5 excludes a series of acoustic models B which is not correct syntactically and semantically from a grammatical point of view. The grammatical control member 5 compiles language models C based on the subjected word or sentence to be recognized.

The grammatical control member 5 has two primary functions.

One function is to exclude words which are not stored in the dictionary. The dictionary contains a vocabulary of words, that is, nouns such as "sea" and "sky", adjectives such as "blue" and "happy" and verbs such as "be" and "make". A corresponding series of acoustic models B is analyzed to determine whether each is recited in the dictionary.

Another function of the grammatical control member 5 is to restrict/select acoustic models B which can connect to the series of acoustic models based on syntactic and semantic restrictions. For example, a combination of words such as "This is a blue sky." is correct. By contrast, a combination of words such as, "This is blue a sky." is excluded, since the combination is syntactically wrong although all words are recited in the dictionary.

Figure 3:
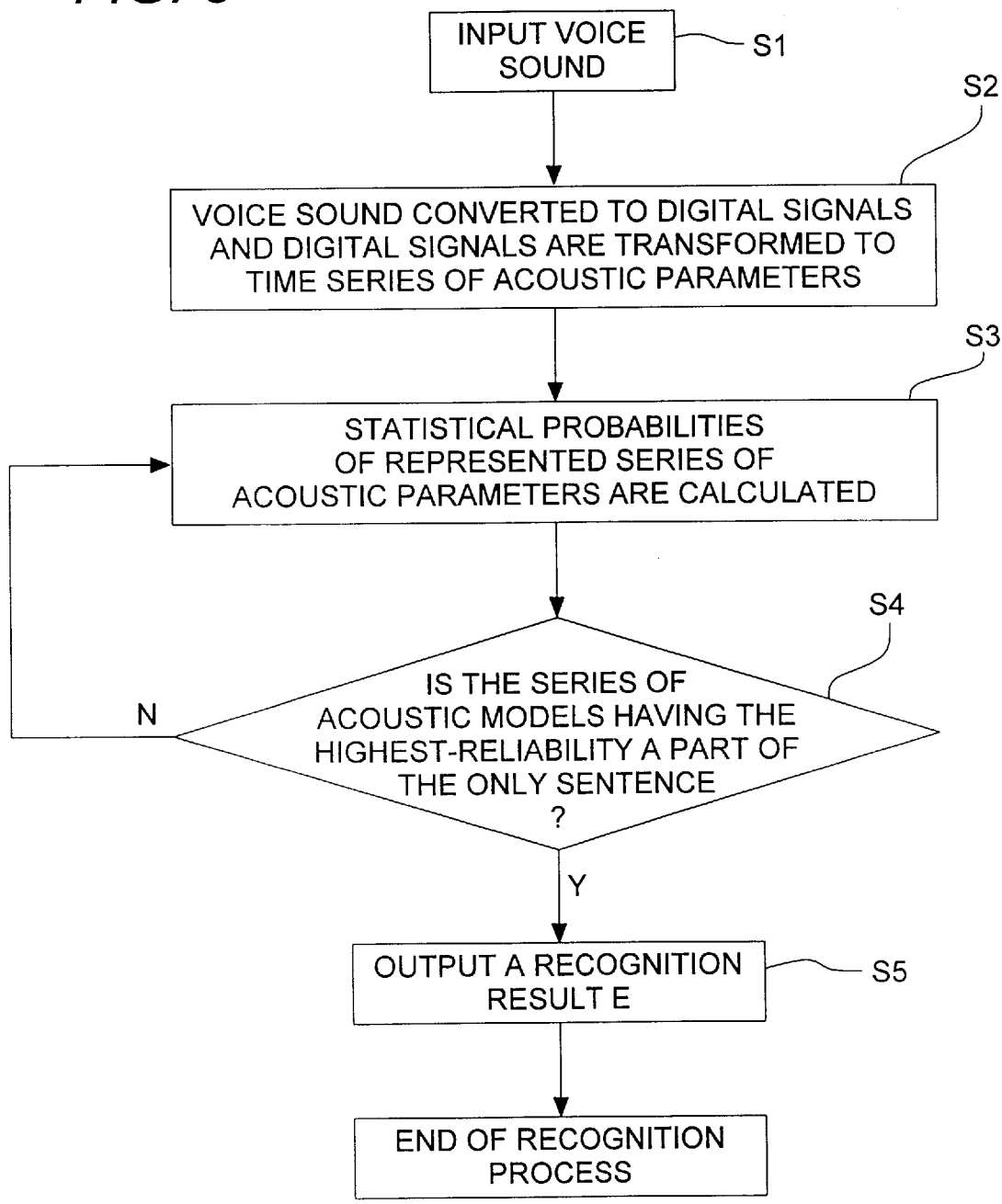
FIG. 3 shows a flow chart for recognizing input voice sounds in the speech recognition system.

FIG. 3 shows a flowchart of the speech recognition system according to the present invention.

When voice sounds are inputted to the acoustic analysis member 1 (step S1), input voice sounds A are converted to digital signals and the digital signals are transformed to a time series of acoustic parameters, such as cepstrum or Δ-cepstrum parameters, in accordance with acoustic analysis (step S2).

The recognition process member 2 calculates statistical probabilities of represented series of acoustic models B from time series of acoustic parameters of input voice sounds A (step S3).

The recognition process member 2 judges whether the series of acoustic models B having the highest reliability is a part of the only sentence in the language model register 4 by comparing the series of the acoustic models B with language models C restricted by the grammatical control member 5 (dictionary, grammar) (step S4).

Unless the recognition process member 2 judges that the compared series of acoustic models B is the only sentence, statistical probabilities of the series of acoustic models B represented in the acoustic model register 3 are repeatedly calculated in order of time series of acoustic parameters of input voice sound A (return to step S3).

When the recognition process section 2 judges that the compared series of acoustic models B is a part of the only sentence, the compared series of language models C has the highest reliability during several successive frames (described below), and the recognition process member 2 outputs to a recognition result E (step S5).

An operation of the embodiment of the present invention will be described with reference to FIG. 1.

(1) The acoustic analysis member 1 transforms input voice sounds A to characteristic vectors for predetermined time periods. Each predetermined time period is called as a frame and is usually from 1 ms to 19 ms in duration. The characteristic vectors determine the acoustic parameters.

(2) Statistical probabilities of the acoustic models B are calculated for the series of characteristic vectors. The acoustic models B are sets of words or subword units, such as phonemes. These acoustic models B are previously learned by utilizing a large number of learned sounds. To calculate the statistical probabilities of the acoustic models B, the HMM method is used.

Figure 2:
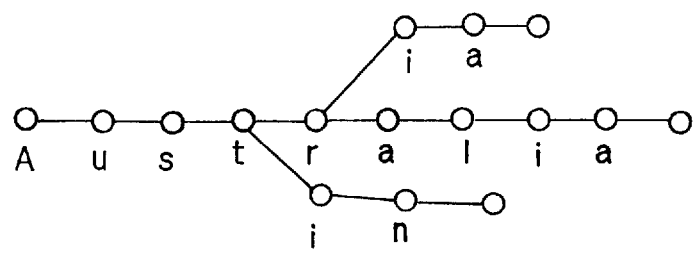
FIG. 2 shows an example of language models utilized in the speech recognition system.

(3) A following acoustic model B which can be connected to a series of acoustic models B is restricted by the grammatical control member 5, including dictionary and grammar restrictions. Language models C corresponding to subjected words and sentences to be recognized are recited and controlled by the grammatical control member 5. As shown in FIG. 2 a language model C looks like a tree.

(4) The recognition process member 2 calculates the statistical probability of a following acoustic model B recited by a language model C for each frame. The recognition process member 2 calculates statistical probabilities of all acoustic models B for the first frame. For the next frame, the language models C having higher statistical probabilities are ranked at higher positions (1st position to N-th position), and are continuously calculated to obtain an acoustic model B which can be connected to the series of the present acoustic models B.

(5) If the series of the acoustic models B having the highest accumulated probability is a part of the only sentence in the language model register C during several successive frames, the subjected sentence including the series of the acoustic models is determined as a recognition result E.

According to the embodiment of the present invention, in a case of an application of "country name or city name" and "predicate", average recognition time can be shortened 30%, from 1.74 second to 1.20 second without deterioration of the accuracy rate of recognition.

For example, a case of recognizing "country name" and "predicate" will be explained.

In such a case, the following predicates (i) and (ii) are anticipated;

(i) isn't it?

(ii) right?

If voice sounds A "That's Australia, right?" is input, the following sentences <1>, <2> and <3> will be output as higher probability candidates by recognizing sounds successively;

<1> Australia right,

<2> Austria right, and

<3> Austin right.

FIG. 2 shows language models C of these candidates. Regarding a country name, "Australia" actually spoken and "Austria" of which utterance is similar to Australia will be output as candidates. Further, "Austin", city name in Texas, will be also output as one of candidates.

A determination that language models C is the only word/sentence is not always judged at a moment when the end of the input voice sounds is detected and may be judged at any moment before the end of the input voice is detected.

In the example, when the statistical probabilities of the acoustic models B following the series of the acoustic models, "Aust [o:st]", are calculated, the statistical probability of "ra [rei]" of "Australia" is higher than that of "ri [ri]" of "Austria". If there are not any words in the dictionary of the grammatical control member 5 except "Australia" after calculating the statistical probability of the series of the acoustic models "Austra", "Australia" is output as a recognition result E and the following calculations are omitted.

As described above, in the present invention, while statistical probability of a series of acoustic models is calculated, a recognition result can be determined if language models selected by a grammatical control member show only one possible sentence. Therefore, redundant calculations are omitted. The amount of calculations necessary to recognize can be reduced in order to shorten a recognition time without deteriorating the accuracy rate of recognition. An interface capability between a person and a machine will be improved by utilizing a speech recognition system according to the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A speech recognition method in a speech recognition system having a language model register for registering a plurality of language models and wherein a plurality of series of acoustic models are previously registered, comprising the steps of:

calculating statistical probabilities of a plurality of series of acoustic models;

selecting a series of acoustic models having the highest probability;

detecting sentences, formed by at least one word, stored in a language model register that correspond to the selected series of acoustic models;

determining a recognition result if only one sentence is detected in said language model register.

2. A speech recognition method as claimed in claim 1, wherein only words which are previously registered in said language model register can form the sentences stored in said language model register.

3. A speech recognition method as claimed in claim 2, wherein only a series of words which is grammatically correct can form the sentences stored in said language model register.

4. A speech recognition method as claimed in claim 1, wherein said language model register stores a plurality of sentences which previously have been spoken by a system user.

5. A speech recognition method as claimed in claim 1, wherein said plurality of series of acoustic models are formed by learning a time series of a plurality of previously formed acoustic models.

6. A speech recognition method as claimed in claim 1, wherein said only one sentence constantly remains in the language model register from a time at which said only one sentence is initially detected until a time at which the recognition result is determined.

7. A speech recognition method as claimed in claim 1, wherein said only one sentence constantly remains in the language model register from a frame at which said only one sentence is initially detected until a frame at which the recognition result is determined.

8. A speech recognition method, comprising the steps of:

calculating statistical probabilities of correspondence between each of a plurality of acoustic models stored in an acoustic model register and inputted voice sounds;

selecting a series of acoustic models having the highest probability of correspondence to the inputted voice sounds;

detecting sentences, formed by at least one word, stored in a language model register, said detected sentences corresponding to the selected series of acoustic models and following acoustic models capable of being appended to the selected series of acoustic models;

outputting a recognition result when only one sentence is detected in said language model register.

9. A speech recognition method as claimed in claim 8, wherein only words which are previously registered in said language model register can form the sentences stored in said language model register.

10. A speech recognition method as claimed in claim 8, wherein only a series of words which is grammatically correct can form the sentences stored in said language model register.

11. A speech recognition method as claimed in claim 8, wherein said language model register stores a plurality of sentences which previously have been spoken by a system user.

12. A speech recognition method as claimed in claim 8, wherein said series of acoustic models stored in said acoustic model register are formed by learning a time series of a plurality of previously formed acoustic models.

13. A speech recognition method for outputting a recognition result prior to detecting the end of an inputted word, comprising the steps of:

selecting a series of acoustic models having the highest probability of representing a beginning portion of an inputted word; and outputting a recognition result when only one following acoustic model can be appended to the selected series of acoustic models to correspond to a grammatically correct sentence, formed by at least one word, stored in a language model register.

14. A speech recognition method which reduces the number of calculations necessary to recognize inputted voice sounds comprising the steps of:

detecting a beginning portion of an inputted word; and outputting a recognition result when only one sentence, formed by at least one word, is detected in a language model register, wherein completing portions are appended to said beginning portion to form sentences stored in said language model register, only words which are previously registered in said language model register can form sentences stored in said language model register, and only a series of words which is grammatically correct can form sentences stored in said language model register.

15. A speech recognition method, comprising the steps of:

selecting a beginning series of acoustic models having the highest probability of representing inputted voice sounds;

selecting a following series of acoustic model capable of being appended to the beginning selected series of acoustic model to form a grammatically correct sentence, formed by at least one word, stored in a language model register; and outputting a recognition result when only one following series of acoustic models remains.

* * * * *